United States Patent [19]
Price

[11] Patent Number: 4,582,430
[45] Date of Patent: Apr. 15, 1986

[54] POSITION DETERMINATION

[75] Inventor: Donald R. C. Price, Kent, England

[73] Assignee: GEC Avionics Limited, England

[21] Appl. No.: 684,510

[22] Filed: Dec. 20, 1984

[30] Foreign Application Priority Data

Jan. 16, 1984 [GB] United Kingdom ............... 8401088

[51] Int. Cl.$^4$ .................. G01B 11/00; G01B 11/14; B25J 11/00
[52] U.S. Cl. .................. 356/375; 356/372; 356/1; 901/14; 901/1 S
[58] Field of Search ............... 356/1, 375; 901/9, 16, 901/47

[56] References Cited

U.S. PATENT DOCUMENTS

| | | | |
|---|---|---|---|
| 4,146,924 | 3/1979 | Birk et al. | 901/47 |
| 4,165,178 | 8/1979 | Coumo, Jr. et al. | 356/1 |
| 4,396,945 | 8/1983 | Di Matteo et al. | 901/9 |

FOREIGN PATENT DOCUMENTS 2549898 5/1977 Netherlands .................. 901/47

Primary Examiner—R. A. Rosenberger
Assistant Examiner—Crystal Cooper
Attorney, Agent, or Firm—Kirschstein, Kirschstein, Ottinger & Israel

[57] ABSTRACT

A method and apparatus for determining the relative positions of a first object (1) and a second object (3). The method comprises illuminating the first object (1) so as to produce a shadow (17) of the first object on a surface (15) lying at a known position with respect to the second object (3) and forming a two dimensional image of a scene including the surface (15). The distance between the position of the shadow (17) and a reference position (19) in the two dimensional image is monitored, and this distance is used to derive information relating to the relative positions of the first object (1) and the second object (3).

9 Claims, 1 Drawing Figure

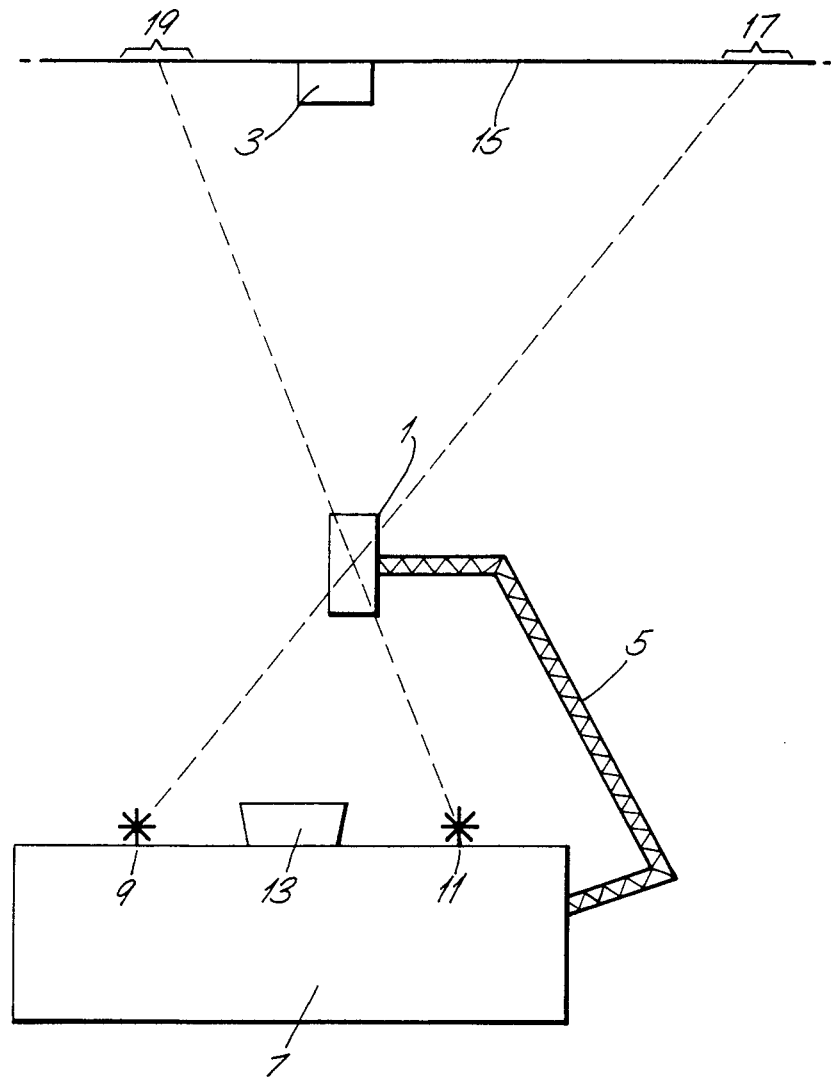

POSITION DETERMINATION

This invention relates to methods of position determination. In particular the invention relates to methods of determining the relative positions of a first object and a second object.

Such methods are frequently necessary in robotics where, for example, it is required to place a manipulator adjacent to an object to be manipulated, the action taking place under the control of a computer. In order for the computer to receive information relating to the relative positions of the manipulator and the object, it is usual for two cameras to be provided, each camera viewing the scene including the manipulator and the object from a different angle, so as to provide stereoscopic information to the computer. The computer then uses the differences between the pictures provided by each of the cameras to determine the relative positions of the manipulator and the object.

It is an object of the present invention to provide a method of determining the relative positions of two objects wherein only one view, and thus only one camera need be provided, and also whereby the interpretation of the information provided by the camera to the computer may be simplified.

According to the present invention, a method of determining the relative positions of a first object and a second object comprises: illuminating said first object so as to produce a shadow of said first object on a surface, said surface being at a known position with respect to said second object; forming a two dimensional image of a scene including said surface; monitoring the distance between the position of said shadow and a reference position in said two dimensional image; and using said distance to derive information relating to the relative positions of said first object and said second object.

In one particular method in accordance with the invention said first object is illuminated so as to produce a second shadow of said first object on said surface, and said reference position is defined by the position of said second shadow.

The invention also provides apparatus for use in a method of determining the relative positions of a first object with respect to a second object comprising: a light source arranged to illuminate said first object so as to produce a shadow of said first object on a surface, said surface being at a known position with respect to said second object; camera means arranged to produce a two dimensional image of a scene including said surface; and means arranged to provide an indication of the relative position of said first object and said second object in dependence on the distance between the position of said shadow and a reference position in said image.

In a preferred form of apparatus in accordance with the invention, the apparatus includes a second light source arranged to illuminate said first object so as to produce a second shadow of said first object on said surface, the position of said second shadow defining said reference position.

One method and apparatus in accordance with the invention will now be described, by way of example only, with reference to the accompanying drawing which is a schematic plan view of the apparatus used in the method.

Referring firstly to FIG. 1, the method to be described is for use in a situation where it is necessary to use a manipulator 1 to grip a remote object 3. The manipulator 1 is carried by a flexible limb 5 consisting of several jointed portions, the limb being capable of extension so as to make the manipulator moveable under the control of a control unit 7. Associated with the control unit 7 are two light sources 9, 11 and a television camera 13 focussed onto a vertical surface 15 to which the object 3 is attached.

In use of the apparatus the sources 9, 11 are switched on in turn so as to illuminate the manipulator 1 such that two shadows 17, 19 of the manipulator are in turn cast on the surface 15. As the shapes of the shadows 17, 19 are related to the shape of the manipulator 1, these are easily recognisable in the image of the surface 15 produced by the camera 13, data derived from this image relating to the relative positions of the shadows on the surface 13 then being processed by computational means (not shown) within the control unit 7. As the relative postiions of the light sources 9, 11 are fixed and known, by the application of geometry, the proportion of the distance of the manipulator from the surface 15 to the total distance between the camera 13 and the surface 15 can be determined. As the distance of the manipulator from the control unit 7 can be estimated by the extensions and angles of the various portions of the limb 5, the actual range of the surface 15, and thus the object 3 can then also be estimated. Using this information, the limb 5 may then be extended until the manipulator 1 lies in the vertical plane including the object 3. As the shadows 17, 19 will move as the manipulator moves towards the surface 15, updated information relating to the relative positions of the object 3 and the manipulator is available. When the manipulator 1 lies in the vertical plane containing the object 3, further adjustment of the position of the manipulator until it lies adjacent to the object 3 is achievable by use of information derived from the two dimensional image of the object 3, and manipulator 1 produced by the camera 13.

It will be appreciated that whilst the particular method described above illustrates the principle behind the invention, many more methods in accordance with the invention are possible. For example, instead of calculating the proportion of the distance of the manipulator 1 from the surface 15 to the distance between the camera and the surface by geometrical considerations, the fact that the shadows 17, 19 will tend to move towards each other as the manipulator 1 moves towards the surface 15 may be used. When the manipulator reaches the surface 15, the shadows 17, 19 will merge, thus indicating that the manipulator 1 lies in the same plane as the object 3.

It will also be appreciated that any number of light sources may be used to give an equivalent number of shadows, generally more light sources, and thus shadows, affording greater accuracy. In one particular adaptation of the method, however, only one light source need be used, and the camera is arranged to monitor the displacement between the manipulator 1 and the single shadow cast on the surface 15. As the manipulator moves towards the surface 15, the manipulator and its own shadow in appropriate circumstances will tend to move towards each other.

It will further be appreciated that whilst it is particularly convenient for the surface 15 to be in the vertical plane containing the object 3, as long as the distance between the object 3 and the surface 15 is known, any convenient surface may be used.

I claim:

1. A method of determining the relative positions of a first object and second object comprising the steps of: illuminating said first object so as to produce a shadow of said first object on a surface, said surface being at a known position with respect to said second object; forming a two dimensional image of a scene including said surface; monitoring the distance between the position of said shadow and a reference position in said two dimensional image; and using said distance to derive information relating to the relative positions of said first object and said second object.

2. A method according to claim 1 in which said first object is illuminated so as to produce a second shadow of said first object on said surface, and said reference position is defined by the position of said second shadow.

3. A method according to claim 1 in which said reference position is defined by the position of said second object in said two dimensional image.

4. A method according to claim 1 including the step of using said information to control the position of said first object.

5. A method according to claim 4 in which said first object is controlled so as to tend to cause said first shadow and said reference position to merge.

6. An apparatus for use in a method of determining the relative positions of a first object and a second object comprising: a surface at a known position with respect to said second object; a light source arranged to illuminate said first object so as to produce a shadow of said first object on said surface; camera means arranged to produce a two dimensional image of a scene including said surface; and means arranged to provide an indication of the relative position of said first object and said second object in dependence on the distance between the postion of said shadow and a reference position in said image.

7. An apparatus according to claim 6 including a second light source arranged to illuminate said first object so as to produce a second shadow of said first object on said surface, the position of said second shadow defining said reference position.

8. An apparatus according to claim 6 including control means arranged to control the position of the first object dependent on said indication.

9. An apparatus according to claim 8 wherein said first object is a manipulator.

* * * * *